US011916338B2

(12) United States Patent
Zhao et al.

(10) Patent No.: US 11,916,338 B2
(45) Date of Patent: Feb. 27, 2024

(54) ELECTRICAL CONNECTOR ASSEMBLY WITH A CONNECTION INDICATOR FOR A MOTOR VEHICLE

(71) Applicant: GM Global Technology Operations LLC, Detroit, MI (US)

(72) Inventors: Xiang Zhao, Novi, MI (US); Dalong Gao, Rochester, MI (US); Jinglin Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 259 days.

(21) Appl. No.: 17/384,267

(22) Filed: Jul. 23, 2021

(65) Prior Publication Data

US 2023/0025116 A1 Jan. 26, 2023

(51) Int. Cl.
*H01R 13/66* (2006.01)
*H01R 13/717* (2006.01)

(52) U.S. Cl.
CPC ....... *H01R 13/6691* (2013.01); *H01R 13/717* (2013.01); *H01R 2201/26* (2013.01)

(58) Field of Classification Search
CPC .............. H01R 13/6691; H01R 13/717; H01R 2201/26; H01R 13/6272; H01R 2107/00
See application file for complete search history.

(56) References Cited

U.S. PATENT DOCUMENTS 9,711,903 B2 7/2017 Chang et al.
2005/0253726 A1* 11/2005 Yoshida .................. B60R 25/04 340/572.8

* cited by examiner

*Primary Examiner* — Briggitte R. Hammond
(74) *Attorney, Agent, or Firm* — Vivacqua Crane PLLC

(57) ABSTRACT

An electrical connector assembly includes a pair of electrical connectors for electrically connecting to one another to close an electric circuit. The assembly further includes a connection indicator attached to one or more of the electrical connectors. The connection indicator generates a feedback, in response to the electrical connectors being one of connected to one another and disconnected from one another. The connection indicator is separate from the electric circuit, and the feedback is at least one of a radio frequency signal (RF signal), an electronic signal, a visible light, and an acoustic signal.

9 Claims, 9 Drawing Sheets

ELECTRICAL CONNECTOR ASSEMBLY WITH A CONNECTION INDICATOR FOR A MOTOR VEHICLE

INTRODUCTION

The present disclosure relates to automotive electronics, and more particularly to an electrical connector assembly with multiple connectors and a connection indicator that provides feedback to indicate that the connectors have been connected or disconnected from one another.

Modern vehicles have multiple electronic systems, and each electronic system can include multiple electronic components with electrical connectors that connect the components to one another. Non-limiting examples of electronic systems can include an engine management system, an ignition system, a radio system, a telematics system, an entertainment system, and other electronic systems. While the electrical connectors may be attached to one another when the vehicle is manufactured, a technician may not have applied sufficient force for fully connecting the electrical connectors to complete the electric circuit. The lack of an electrical connection between the electrical connectors may not be discovered until the electronic system is tested and/or operated.

Thus, while existing electrical connectors achieve their intended purpose, there is a need for a new and improved electrical connector assembly that addresses these issues.

SUMMARY

According to several aspects of the present disclosure, an electrical connector assembly is provided for an electronic system of a motor vehicle, with the electronic system having multiple electrical components. The assembly includes a pair of electrical connectors for each electrical component and electrically connecting to one another to close an electric circuit. The assembly further includes a connection indicator attached to one or more of the electrical connectors. The connection indicator generates a feedback, in response to the electrical connectors being connected to one another or disconnected from one another. The connection indicator is separate from the electric circuit, and the feedback is at least one of a radio frequency signal (RF signal), an electronic signal, a visible light, and an acoustic signal.

In one aspect, the connection indicator includes a first support portion attached to one of the electrical connectors. The connection indicator further includes a second support portion for engaging the other one of the electrical connectors, in response to the electrical connectors being connected to one another. The connection indicator further includes a frangible portion connecting the first and second support portions to one another. The frangible portion is adapted to fracture, in response to the second support portion being engaged by one of the electrical connectors and the electrical connectors connecting with one another.

In another aspect, the first and second support portions have an associated one of first and second thicknesses, and the frangible portion has a third thickness that is less than each of the first and second thicknesses.

In another aspect, the first and second support portions and the frangible portion are integral parts of a single-piece body.

In another aspect, one of the electrical connectors defines a recess, and the connection indicator is positioned within the recess. The other one of the electrical connectors includes a surface adapted to engage the second support portion of the connection indicator, in response to the electrical connectors being connected to one another.

In another aspect, the assembly further includes a radio frequency identification tag (RFID tag) having an integrated circuit that is coupled to the frangible portion. The integrated circuit breaks, in response to the frangible portion fracturing such that the RFID tag does not transmit the RF signal to a wireless transceiver device.

In another aspect, the RFID tag is capable of transmitting the RF signal to the Wireless transceiver device before the electrical connectors are connected to one another and the integrated circuit breaks.

In another aspect, the connection indicator emits the acoustic signal in response to the frangible portion fracturing.

In another aspect, the connection indicator includes a light source for emitting a light, a first polarizing filter for transmitting the light along a first transmission plane, and a second polarizing filter for transmitting the light along a second transmission plane. The second polarizer filter is movable between first and second positions relative to the first polarizer filter. The connection indicator further includes a gear train attached to the second polarizing filter for moving the second polarizing filter to the second position, in response to the electrical connectors being connected to one another.

In another aspect, the gear train moves the second polarizing filter to the second position such that the first and second transmission planes are positioned at right angles relative to one another for blocking light, in response to the electrical connectors being connected to one another.

In another aspect, the gear train moves the second polarizing filter to the second position such that the first and second transmission planes are not positioned at right angles relative to one another and the first and second polarizing filters transmit the light, in response to the electrical connectors being connected to one another.

In another aspect, the gear train includes a rack attached to one of the electrical connectors and a pinion gear rotatably mounted to the other of the electrical connectors. The pinion gear is driven by the rack, in response to the electrical connectors being connected to one another. The gear train further includes a first bevel gear coupled to the pinion gear, with the first bevel gear being driven by the pinion gear. The gear train further includes a second bevel gear engaged to the first bevel gear and the second polarizing filter. The first bevel gear drives the second bevel gear, which in turn moves the second polarizing filter from the first position to the second position.

In another aspect, the second bevel gear is coupled to a drive shaft that is in turn coupled to a center of the second polarizing filter.

In another aspect, the second bevel gear is a ring gear coupled to a peripheral portion of the second polarizing filter.

In another aspect, the connection indicator includes one or more wireless pressure sensors attached to one or more of the electrical connectors. The wireless pressure sensor emits the electronic signal, in response to the electrical connectors being connected to one another.

In another aspect, one of the electrical connectors defines a recess with the wireless pressure sensor positioned within the recess. The other one of the electrical connectors includes a surface for engaging the wireless pressure sensor.

In another aspect, the pair of electrical connectors have an associated one of first and second fasteners, with the first and second fasteners engaging one another to hold the electrical connectors in connection with one another. The wireless pressure sensor is attached to one of the first and second fasteners such that the other of the first and second fasteners actuates the wireless pressure sensor to emit the electronic signal, in response to the first and second fasteners engaging one another.

In another aspect, the connection indicator comprises a radio frequency identification tag (RFID tag) having an integrated circuit, with the integrated circuit including a first portion attached to one of the electrical connectors and a second portion attached to the other of the electrical connectors. The first and second portions of the integrated circuit electrically connect to one another to complete the integrated circuit for transmitting the RF signal, in response to the electrical connectors being connected to one another.

According to several aspects of the present disclosure, a motor vehicle includes an electronics system having an electric circuit with a plurality of electrical components. The electrical components include at least a power source, a controller, and at least one load, and an electrical connector assembly. The assembly includes a pair of electrical connectors for electrically connecting to one another to close the electric circuit. The assembly further includes a connection indicator attached to at least one of the electrical connectors. The connection indicator generates a feedback, in response to the electrical connectors being connected to one another or disconnected from one another. The connection indicator is separate from the electric circuit, and the feedback is at least one of a radio frequency signal (RF signal), an electronic signal, a visible light, and an acoustic signal.

According to several aspects of the present disclosure, a method is provided for assembling an electrical connector assembly having a pair of electrical connectors and a connection indicator attached to at least one of the electrical connectors. The method includes electrically connecting the electrical connectors to one another to create an electric circuit, with the connection indicator being separate from the electric circuit. The method further includes generating, using the connection indicator, a feedback. The feedback includes at least one of a radio frequency signal, an electronic signal, a visible light, and an acoustic signal, in response to the electrical connectors being connected to one another or disconnected from one another.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one non-limiting example of an electrical connector assembly for an electronics system of a motor vehicle. The assembly includes two or more electrical connectors and a connection indicator for providing feedback and/or notification that the electrical connectors have been electrically connected to one another or disconnected from one another. While these non-limiting examples of the connection indicator provide feedback in the form of a radio frequency signal (RF signal), an electronic signal, a visible light, an acoustic signal, or any combination thereof, it is contemplated that the connection indicator can provide other suitable forms of feedback and/or notification. Furthermore, it is contemplated that the electrical connector assembly can be integrated within any automotive or non-automotive electronics system.

Figure 1:
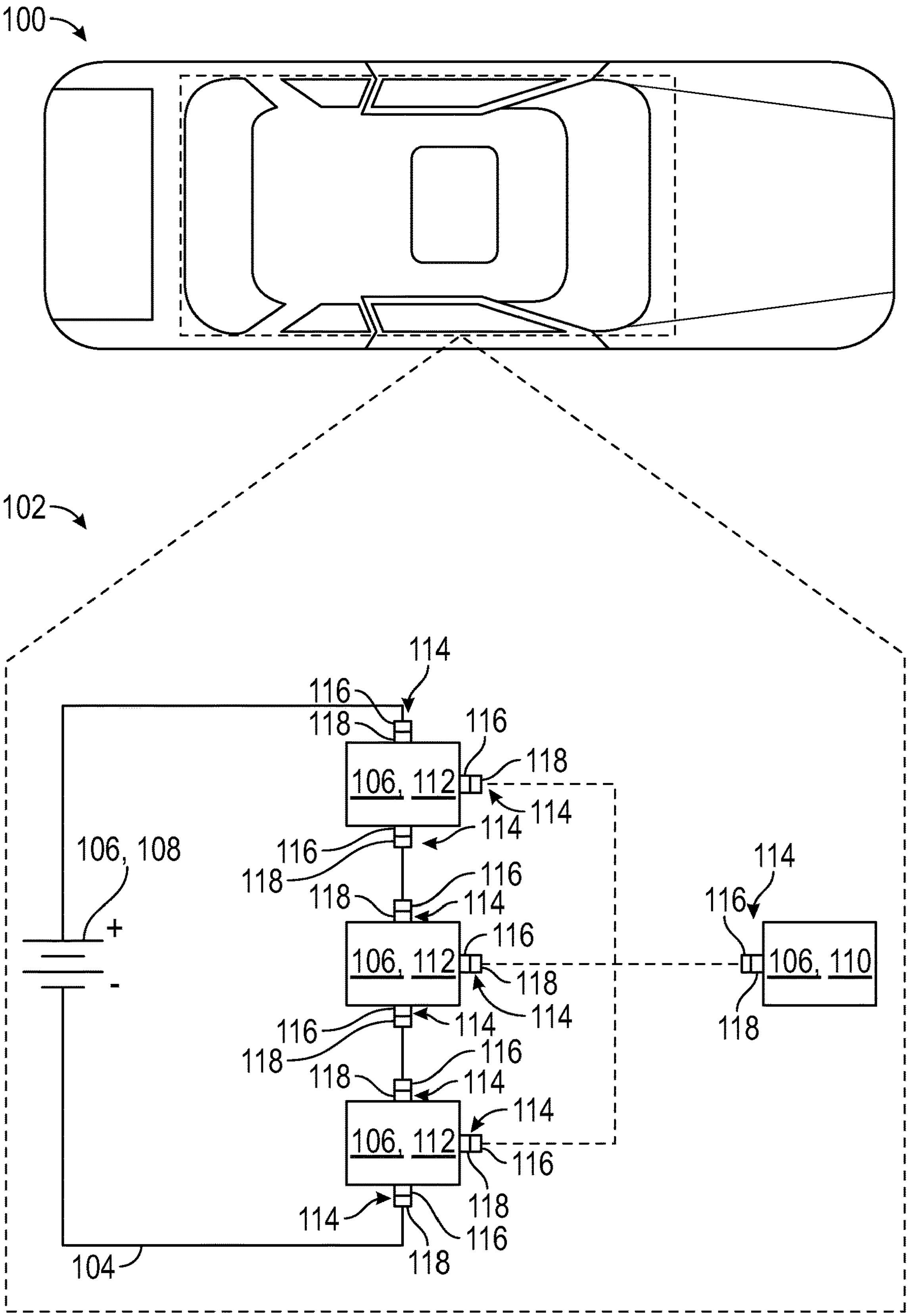
FIG. 1 is a schematic diagram of one example of a motor vehicle having an electronics system with multiple electrical components electrically connected to one another by associated electrical connector assemblies.

Referring to FIG. 1, one example of a motor vehicle 100 includes an electronics system 102 having an electric circuit 104 with a plurality of electrical components 106. Non-limiting examples of the electronics system 102 can include ‘an engine management system, an ignition system, a radio system, a telematics system, an entertainment system, and other suitable electronic systems. The components 106 can include at least a power source 108, a controller 110, and one or more loads 112. It is contemplated that the electronics system can include other suitable electrical components.

Figure 2:
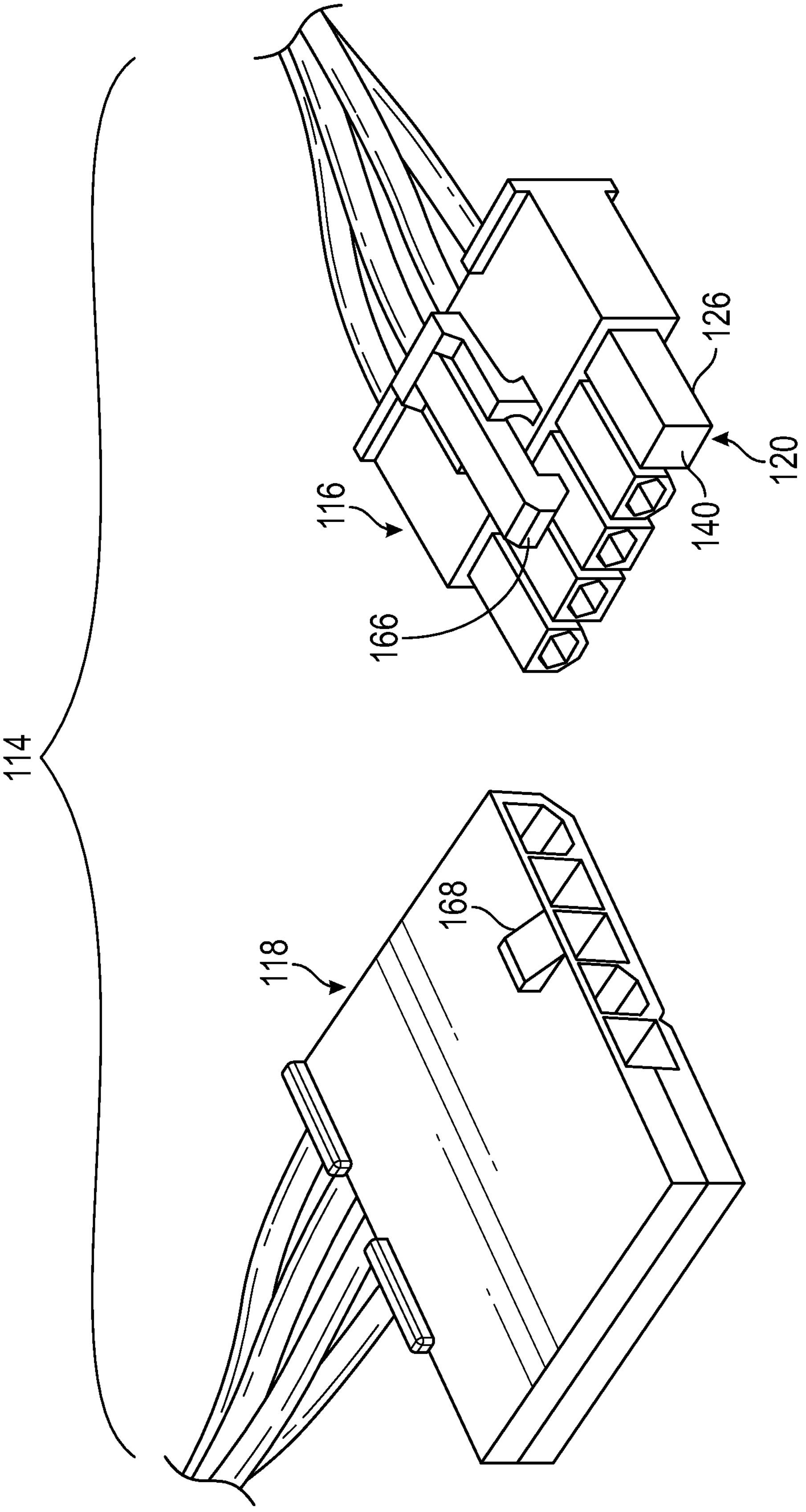
FIG. 2 is a perspective exploded view of the electrical connector assembly of FIG. 1, illustrating the assembly having a pair of electrical connectors, a connection indicator, and a pair of fasteners for holding the connectors in connection with one another.
Figure 3:
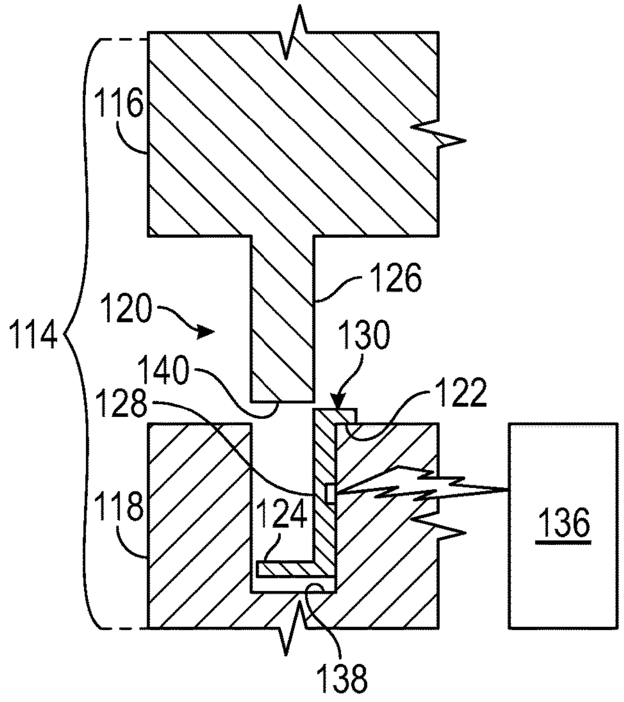
FIG. 3 is an enlarged cross-sectional view of the electrical connector assembly of FIG. 2 prior to the electrical connectors being electrically connected to one another, and illustrating the connection indicator having a single-piece body with a frangible portion.
Figure 4:
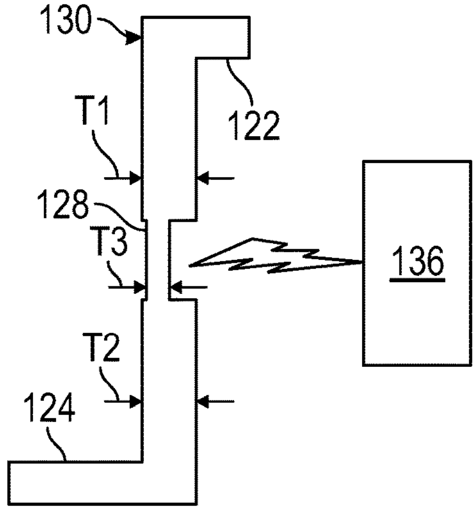
FIG. 4 is an enlarged side view of the single-piece body of the connection indicator of FIG. 3.

Referring to FIG. 2, the electronics system 102 further includes an electrical connector assembly 114 (“assembly”) having a pair of electrical connectors 116, 118 for an associated one of the electrical components 106 (FIG. 1) and for electrically connecting to one another to close the electric circuit 104 (FIG. 1). The assembly 114 further includes a connection indicator 120 attached to at least one of the electrical connectors 116, 118, with the connection indicator 120 generating a feedback and/or notification, in response to the electrical connectors 116, 118 connected to one another or disconnected from one another. As described in detail below, the connection indicator 120 is separate from the electric circuit 104, and the feedback and/or notification is at least one of a radio frequency signal (RF signal) (FIGS. 3-6), an electronic signal (FIGS. 11-15), a visible light (FIGS. 7-10), and an acoustic signal (FIGS. 3-6).

Figure 5:
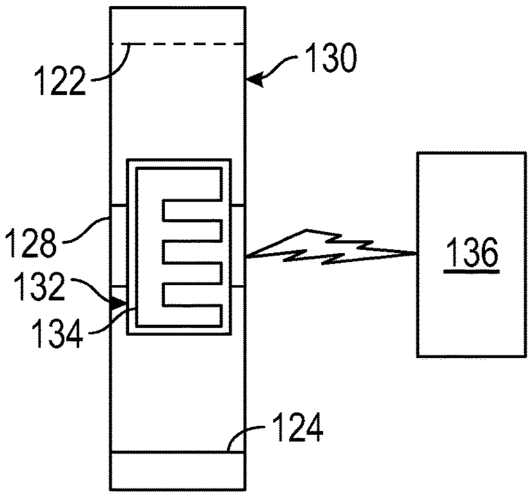
FIG. 5 is an enlarged front view of the single-piece body of the connection indicator of FIG. 3, illustrating the connection indicator further having a radio frequency identification tag (RFID tag) attached to the frangible portion of the single-piece body.
Figure 6:
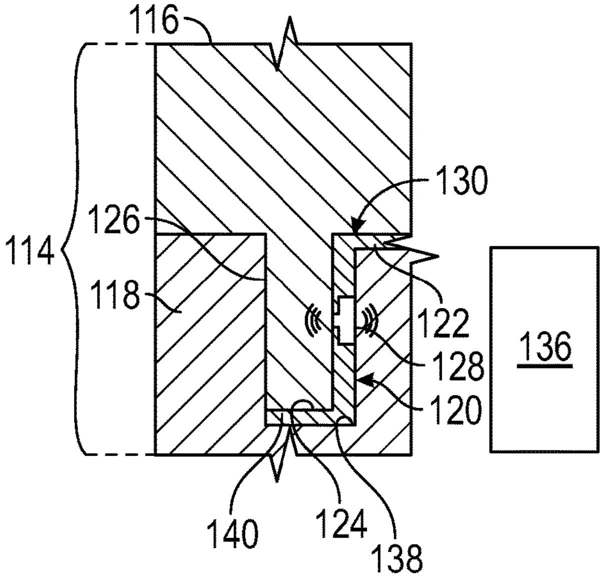
FIG. 6 is an enlarged cross-sectional view of the electrical connector assembly of FIG. 3, illustrating the frangible portion being fractured and the RFID tag broken, in response to the electrical connectors being electrically connected to one another.

Referring now to FIGS. 3-6, the connection indicator 120 includes a first support portion 122 attached to one of the electrical connectors 118 and a second support portion 124 engaged by a projection 126 extending from the other electrical connector 116, in response to the electrical connectors 116, 118 being connected to one another. In this example, the connection indicator 120 further includes a frangible portion 128 connecting the first and second support portions 122, 124 to one another. Also, in this example, the first and second support portions 122, 124 have an associated one of first and second thicknesses T1, T2, and the frangible portion 128 has a third thickness T3 that is less than each of the first and second thicknesses T1, T2. The first and second support portions 122, 124 and the frangible portion 128 are integral parts of a single-piece body 130. As best shown in FIG. 5, in this example, the connection indicator 120 further includes a radio frequency identification tag 132 (RFID tag) having an integrated circuit 134 that is coupled to the frangible portion 128. The RFID tag 132 is capable of transmitting an RF signal to a wireless transceiver device 136 before the integrated circuit 134 breaks when the electrical connectors 116, 118 are connected to one another. In this non-limiting example, one of the electrical connectors 118 defines a recess 138 with the connection indicator 120 positioned in the recess 138, and the other one of the electrical connectors 116 has the projection 126 with a surface 140 adapted to engage the second support portion 124 of the connection indicator 120, in response to the electrical connectors 116, 118 being connected to one another. As best shown in FIG. 6, the frangible portion 128 is adapted to fracture and the integrated circuit is adapted to break such that the RFID tag 132 does not transmit the RF signal to the Wireless transceiver device 136, in response to the surface 140 of the projection 126 engaging the second support portion 124 when the connectors 116, 118 are connected to one another. Also in this example, when the frangible portion 128 fractures, the connection indicator 120 emits an acoustic signal or other audible sound that is capable of being heard by a technician connecting the electrical connectors 116, 118 to one another. In other examples, it is contemplated that the connection indicator 120 includes only the single-piece body 130 without the RF ID tag 132, such that the feedback consists of only the acoustic signal generated by the frangible portion 128 fracturing.

Figure 7:
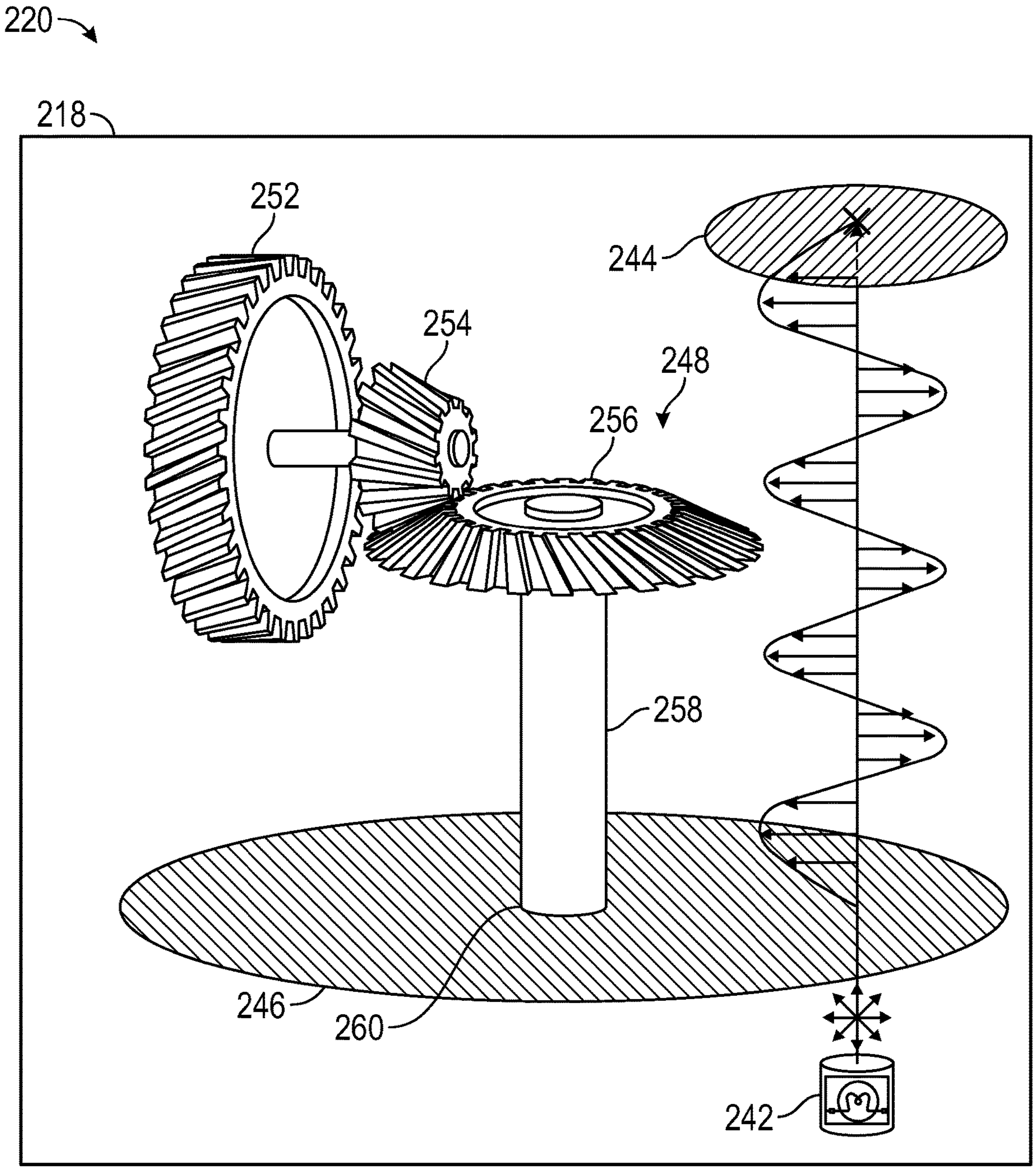
FIG. 7 is an enlarged perspective view of another example of the connection indicator of FIG. 2, illustrating the connection indicator having a light source and a pair of polarizing filters attached to one of the electrical connectors for blocking light emitted from the light source before the electrical connectors are connected to one another.
Figure 8:
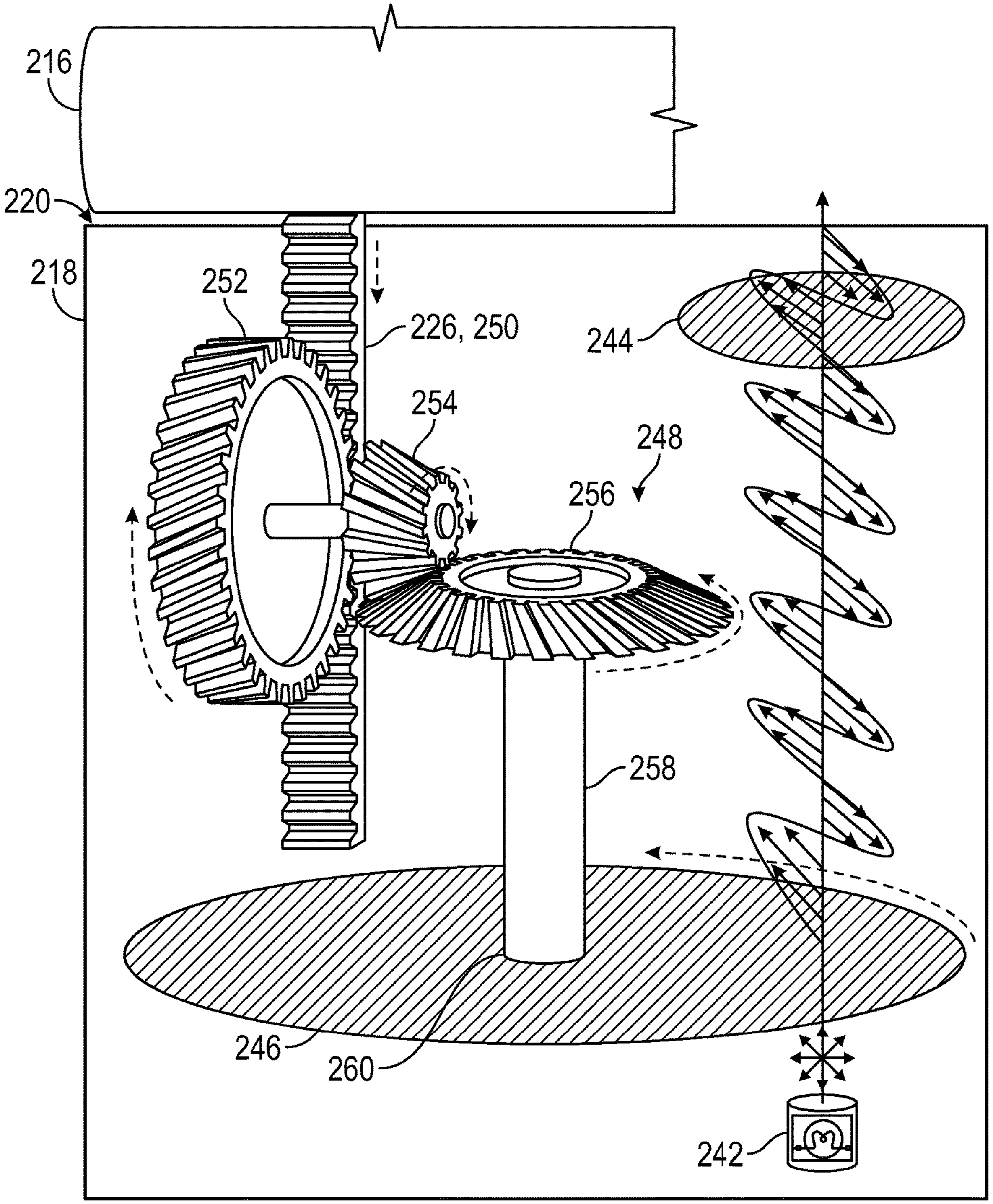
FIG. 8 is an enlarged perspective view of the connection indicator of FIG. 7, illustrating the connection indicator further having a rack extending from one of the electrical connectors and a gear train that is carried by the other electrical connector, with the gear train being engaged by the rack for moving at least one of the polarizing filters to transmit light when the electrical connectors are connected to one another.

Referring now to FIGS. 7 and 8, another example of a connection indicator 220 includes a light source 242 mounted to the electrical connector 218 for emitting a light to indicate that the electrical connectors have been electrically connected to one another. The connection indicator 220 further includes a first polarizing filter 244 mounted to the electrical connector 218 for transmitting the light along a first transmission plane, The connection indicator 220 further includes a second polarizing filter 246 mounted to the electrical connector 218 for transmitting the light along a second transmission plane, and the second polarizing filter 246 is movable between a first position (FIG. 7) and a second position (FIG. 8) relative to the first polarizing filter 244. The connection indicator 220 further includes a gear train 248 mounted to the electrical connector 218 and the second polarizing filter 246 for moving the second polarizing filter 246 to at least one of the first and second positions, in response to the electrical connectors 216, 218 being connected to one another. In the example shown in FIG. 8, and in response to the electrical connectors 216, 218 being connected to one another, the gear train 248 moves the second polarizing filter 246 to the second position such that the first and second transmission planes are not positioned at right angles relative to one another, such that the first and second polarizing filters transmit the light from the light source 242 to a technician determining whether the electrical connectors 216, 218 have been connected to one another. However, it is contemplated that the gear train 248 can instead move the second polarizing filter 246 to the second position, such that the first and second transmission planes are positioned at right angles relative to one another for blocking light, in response to the electrical connectors 216, 218 being connected to one another. Put another way, the gear train 248 and the first and second polarizing filters 244, 246, can be configured to transmit light that is visible to the technician for indicating that the electrical connectors are connected to one another or disconnected from one another.

While the connection indicator 120 of FIG. 2 includes the projection 126 without any teeth, the connection indicator 220 includes the gear train 248 that has a rack 250 attached to the electrical connector 216. The gear train 248 further includes a pinion gear 252 rotatably mounted to the other electrical connector 218, and the pinion gear 252 is driven by the rack 250, in response to the electrical connectors 216, 218 being connected to one another. The gear train 248 further includes a first bevel gear 254, which is rotatably mounted to the electrical connector 218 and engaged with the pinion gear 252. The first bevel gear 254 is driven by the pinion gear 252. The gear train 248 further includes a second bevel gear 256, which is rotatably mounted to the electrical connector 218 and engaged to the first bevel gear 254. The second bevel gear 256 is driven by the first bevel gear 254, and the second polarizing filter 246 is moved by the second bevel gear 256. In this example, the second bevel gear 256 is coupled to a drive shaft 258 that is in turn coupled to a center portion 260 of the second polarizing filter 246. It is contemplated that the gear train can have other suitable gears and/or further include a biasing member, e.g., a torsional spring, for returning the second polarizer filter from the second position to the first position.

Figure 9:
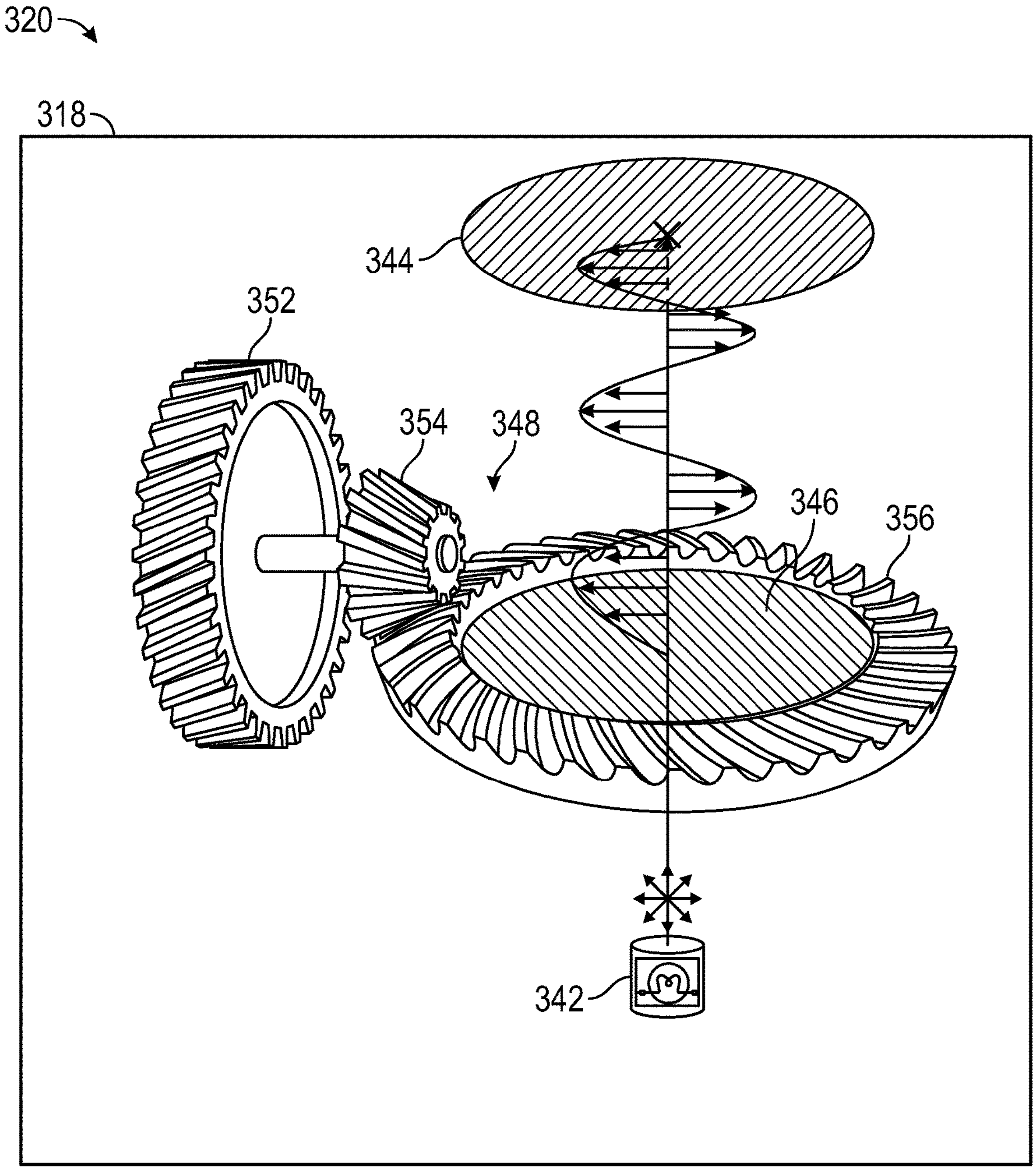
FIG. 9 is an enlarged perspective view of yet another example of the connection indicator of FIG. 2, illustrating the connection indicator having a pair of polarizers and a gear train with a ring gear surrounding one of the polarizers.
Figure 10:
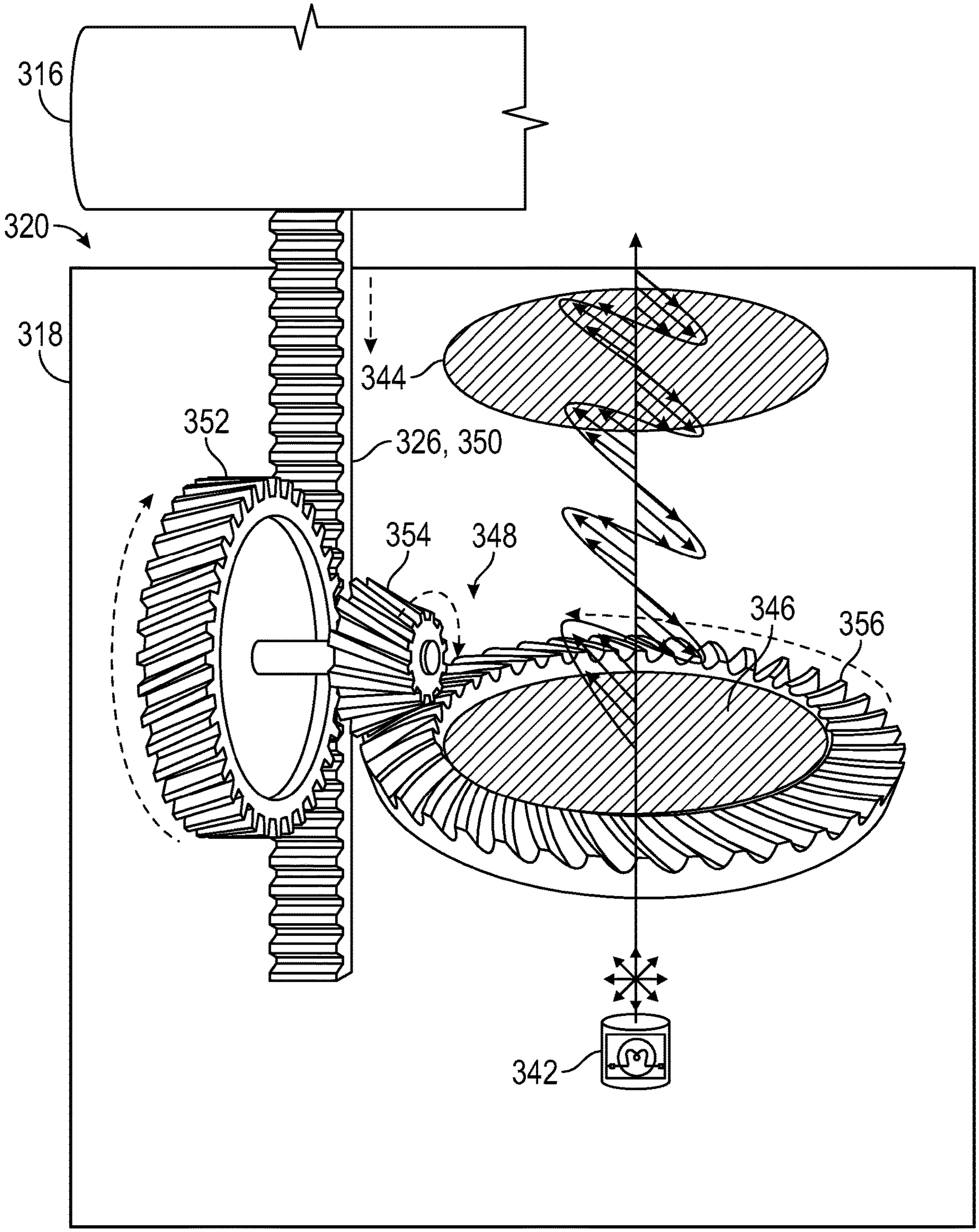
FIG. 10 is an enlarged perspective view of the connection indicator of FIG. 9, illustrating the ring gear moving one of the polarizing filters relative to the other one of the polarizing filters for transmitting light emitted when the electrical connectors are connected to one another.

Referring to FIGS. 9 and 10, another example of a gear train 348 for a connection indicator 320 is similar to the gear train 248 for the connection indicator 220 of FIGS. 7 and 8, and the gear train 348 has similar components identified by the same numbers increased by 100. However, while the gear train 248 of FIGS. 7 and 8 includes the second bevel gear 256, the gear train 348 includes a bevel ring gear 356 attached to a peripheral portion 362 of the second polarizing filter 346. While each of the examples illustrated in FIGS. 7-10 includes two pairs of gears engaged to one another, it is contemplated that other examples of the connection indicator can have more or fewer than two pairs of gears. As but one non-limiting example, the gear train can include a ball screw with a threaded shaft having a helical raceway for ball bearings that act as a precision screw.

Figure 11:
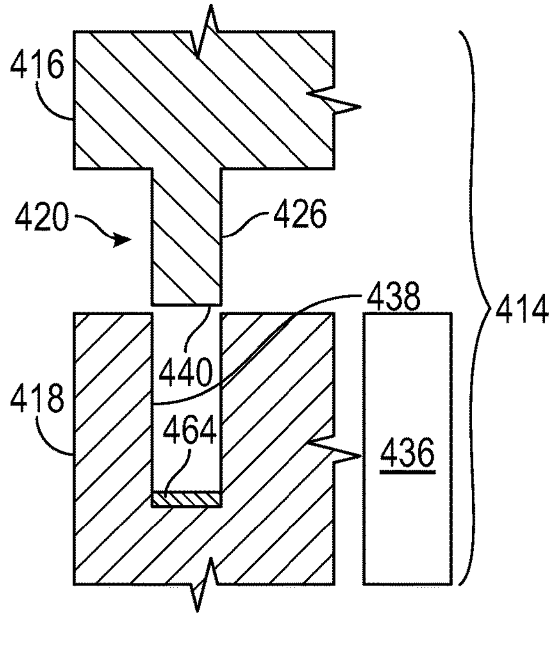
FIG. 11 is an enlarged cross-sectional view of another example of the electrical connector assembly of FIG. 3, illustrating the connection indicator being a wireless pressure sensor disposed in a recess formed in one electrical connector and engaged by a projection extending from another electrical connector.
Figure 12:
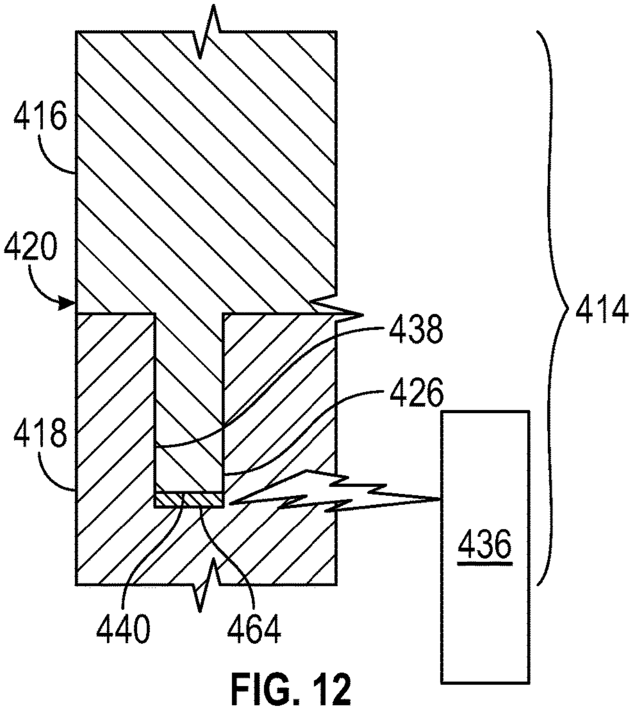
FIG. 12 is an enlarged cross-sectional view of the electrical connector assembly of FIG. 11, illustrating the projection received in the recess for actuating the wireless pressure sensor in response to the electrical connectors being connected to one another.

Referring now to FIGS. 11 and 12, another example of an electrical connector assembly 414 having a connection indicator 420 is similar to the electrical connector assembly 114 of FIGS. 3-6 having the connection indicator 120. The assembly 414 has similar components identified by the same reference numbers increased by 300. However, while the connection indicator 120 of FIGS. 3-6 includes the RFID tag 132 attached to the single-piece body 130 and positioned within the recess 138 of the electrical connector 118, the connection indicator 420 is a wireless pressure sensor 464 positioned within the recess 438 of the electrical connector 418. As shown in FIG. 12, the electrical connector 416 includes a projection 426 includes a surface 440 received within the recess 438 for engaging the wireless pressure sensor 464, in response to the first and second electrical connectors 416, 418 being electrically connected to one another. The wireless pressure sensor 464 transmits the electronic signal to a wireless transceiver device to notify the technician that the connectors 416, 418 have been electrically connected to one another.

Figure 13:
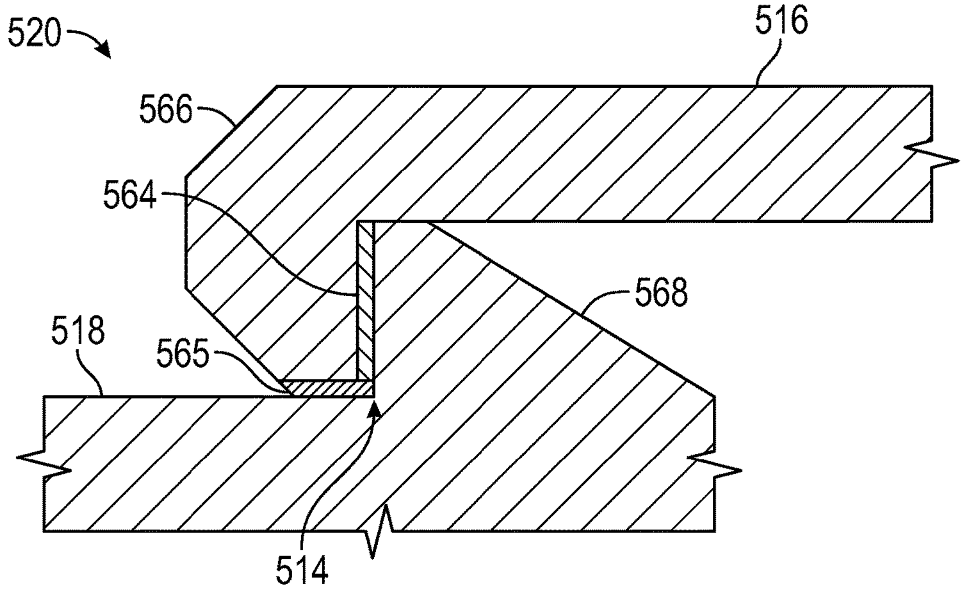
FIG. 13 is an enlarged cross-sectional view of the fasteners of the electrical connectors of FIG. 2, illustrating still another example of the connection indicator including multiple wire pressure sensors attached to one or more of the fasteners.
Figure 14:
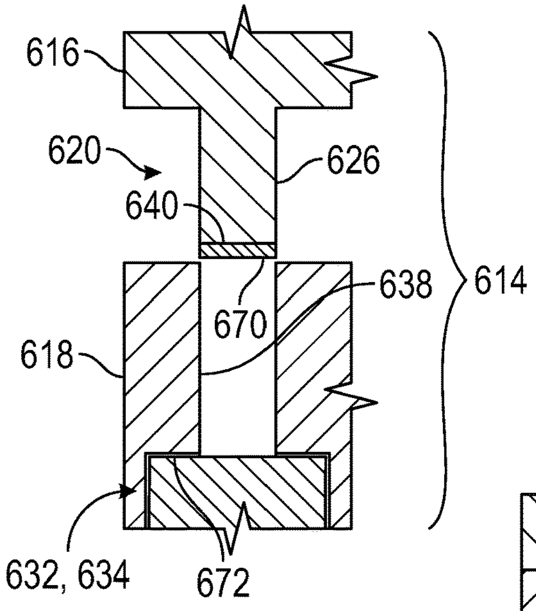
FIG. 14 is an enlarged cross-sectional view of another example of the electrical connector assembly of FIG. 2, illustrating the connection indicator including a radio frequency identification tag having an integrated circuit with a first portion attached to a projection extending from one of the electrical connectors and a second portion positioned adjacent to a recess formed in the other of the electrical connectors.
Figure 15:
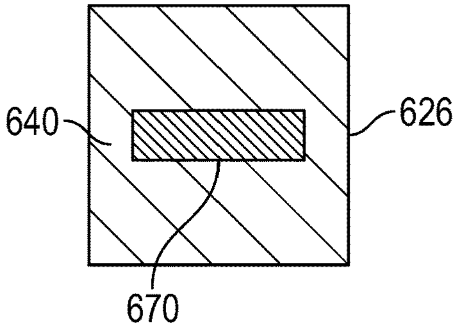
FIG. 15 is a schematic end view of the projection of FIG. 14.
Figure 17:
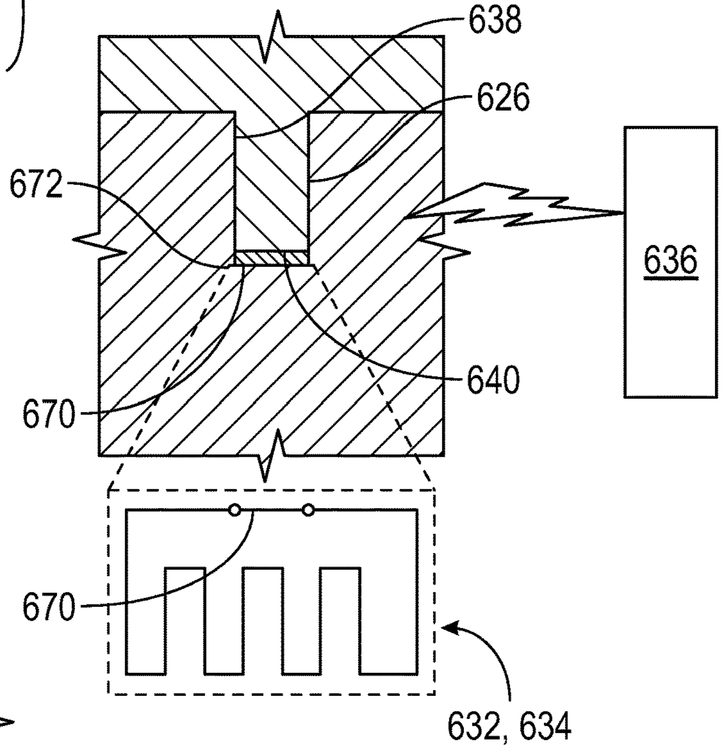
FIG. 17 is an enlarged cross-sectional view of the electrical connector assembly of FIG. 14, illustrating the first and second portions of the integrated circuit electrically connected to one another to close the circuit, in response to the electrical connectors being connected to one another.
Figure 16:
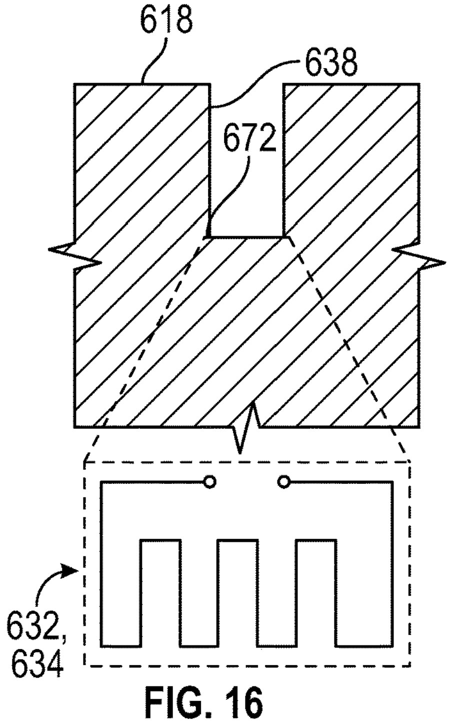
FIG. 16 is an enlarged cross-sectional view of the electrical connector of FIG. 14, with the electrical connector having the second portion of the circuit disposed adjacent to the recess.

Referring to FIG. 13, an enlarged cross-sectional view of another example of fasteners 566, 568 for an electrical connector assembly 514 is shown. The fasteners 566, 568 are similar to the fasteners 166, 168 for the electrical connector assembly 114 of FIG. 2, and the assembly 114 has the same components identified by the same numbers increased by 400. However, while the electrical connector assembly 114 of FIG. 2 has the connection indicator 120 in the form of a projection 126 for engaging the single-piece body 130 to fracture the frangible portion 128 and the integrated circuit 134 attached to the frangible portion 128, the electrical connector assembly 514 has a connection indicator 520 in the form of one or more wireless pressure sensors 564, 565 attached to an associated one of the fasteners 566, 568. More specifically, the pair of electrical connectors 516, 518 have an associated one of first and second fasteners 566, 568, e.g., a pair of hook and latch fasteners, with the first and second fasteners 566, 568 engaging one another to hold the electrical connectors 516, 518 in connection with one another. The wireless pressure sensors 564, 565 are attached to an associated one of the first and second fasteners 566, 568 such that the other one of the first and second fasteners 566, 568 actuates the associated wireless pressure sensor, in response to the first and second fasteners 566, 568 engaging one another. At least one of the wireless pressure sensors 564, 565 emits the electronic signal, in response to the electrical connectors being connected to one another and the fasteners 566, 568 engaging one another. The electrical connector 516 defines a recess 538 with one wireless pressure sensor 564 positioned within the recess 538, and the other electrical connector 518 includes a surface 540 for engaging the wireless pressure sensor 565.

Referring now to FIGS. 14-17, another example of an electrical connector assembly 614 is similar to the electrical connector assembly 114 of FIGS. 3-6 and has similar components identified by the same reference numbers increased by 500. However, while the connection indicator 120 of FIGS. 3-6 has the integrated circuit 134 that is broken in response to the electrical connectors 116, 118 being electrically connected to one another, the connection indicator 620 includes an RFID tag 632 having an integrated circuit 634 with a first portion 670 attached to the projection 626 of the first electrical connector 616 and a second portion 672 positioned adjacent to the recess 638 of the second electrical connector 618. The first and second portions 670, 672 electrically connect to one another to complete or close the integrated circuit 634 and transmit the RF signal to the wireless transceiver device 636, in response to the projection 626 being received within the recess 638 when the first and second electrical connectors 616, 618 are connected to one another.

Figure 18:
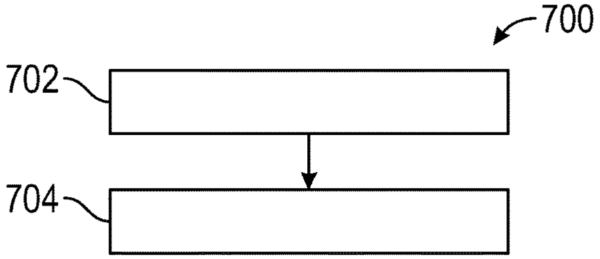
FIG. 18 is flow chart of one example of a method for operating the electrical connection assembly of FIG. 2.

Referring now to FIG. 18, a flow chart of one example of a method 700 for operating the electrical connector assembly 114 of FIG. 2 is provided. The method 700 begins at block 702 with the electrical connectors 116, 118 being connected to one another. In this example, the projection 126 (FIGS. 2-6) extending from the electrical connector 116 is aligned with the recess 138 formed in the other electrical connector 118, such that the recess 138 receives the projection 126 when the electrical connectors 116, 118 are electrically connected to one another.

At block 704, the connection indicator 120 generates a feedback that includes a radio frequency signal, an electronic signal, a visible light, and/or an acoustic signal, in response to the electrical connectors 116, 118 being one of connected to one another and disconnected from one another. Continuing with the previous example, the surface 140 on the projection 126 engages the second support portion 124 of the single-piece body 130 for fracturing the frangible portion 128 and breaking the integrated circuit 134 attached to the frangible portion 128, in response to the electrical connectors 116, 118 being electrically connected to one another. In other examples (FIGS. 7-10), the connection indicator includes first and second polarizing filters with associated first and second transmission planes and a gear train for moving the second polarizing filter relative to the first polarizing filter, such that the visible light is emitted to a technician, in response to the technician electrically connecting the first and second electrical connectors to one another. In yet other examples FIGS. 11-13, the connection indicator includes one or more wireless pressure sensors attached to one or more of the electrical connectors, such that the wireless pressure sensor is engaged for transmitting an electronic signal to a wireless transceiver device, in response to the electrical connectors being electrically connected to one another. In still another example (FIGS. 14-17), the connection indicator includes an RFID tag having an integrated circuit with a first portion carried by the projection extending from one of the electrical connectors and a second portion positioned adjacent to the recess formed in the other electrical connector, such that the first and second portions electrically connect to one another to emit the RF signal, in response to the electrical connectors being electrically connected to one another.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrical connector assembly for a motor vehicle, the electrical connector assembly comprising:

- a pair of electrical connectors for electrically connecting to one another to close an electric circuit; and
- a connection indicator attached to at least one of the electrical connectors, with the connection indicator generating a feedback in response to the electrical connectors being one of connected to one another and disconnected from one another;
- wherein the connection indicator comprises:
  - a first support portion attached to one of the electrical connectors;
  - a second support portion for engaging the other one of the electrical connectors in response to the electrical connectors being connected to one another; and
  - a frangible portion connecting the first and second support portions to one another, with the frangible portion being adapted to fracture in response to the second support portion being engaged by one of the electrical connectors and the electrical connectors connecting with one another;
- wherein the connection indicator is separate from the electric circuit; and
- wherein the feedback is at least one of a radio frequency signal (RF signal), an electronic signal, a visible light, and an acoustic signal.

2. The electrical connector assembly of claim 1 wherein the first and second support portions have an associated one of first and second thicknesses, and the frangible portion has a third thickness that is less than each of the first and second thicknesses.

3. The electrical connector assembly of claim 2 wherein the first and second support portions and the frangible portion are integral parts of a single-piece body.

4. The electrical connector assembly of claim 3 wherein one of the electrical connectors defines a recess with the connection indicator positioned within the recess, and the other one of the electrical connectors comprises a surface adapted to engage the second support portion of the connection indicator in response to the electrical connectors being connected to one another.

5. The electrical connector assembly of claim 4 further comprising:

- a radio frequency identification tag (RFID tag) having an integrated circuit that is coupled to the frangible portion, with the integrated circuit breaking in response to the frangible portion fracturing such that the RFID tag does not transmit the RF signal to a wireless transceiver device.

6. The electrical connector assembly of claim 5 wherein the RFID tag is capable of transmitting the RF signal to the Wireless transceiver device before the electrical connectors are connected to one another and the integrated circuit breaks.

7. The electrical connector assembly of claim 4 wherein the connection indicator emits the acoustic signal in response to the frangible portion fracturing.

8. A motor vehicle comprising:

- an electronics system having an electric circuit with a plurality of electrical components, and the plurality of electrical components include at least a power source, a controller, and at least one load; and
- an electrical connector assembly comprising:
  - a pair of electrical connectors for electrically connecting to one another to close the electric circuit; and
  - a connection indicator attached to at least one of the electrical connectors, with the connection indicator generating a feedback in response to the electrical connectors being one of connected to one another and disconnected from one another;
  - wherein the connection indicator comprises:
    - a first support portion attached to one of the electrical connectors;
    - a second support portion for engaging the other one of the electrical connectors in response to the electrical connectors being connected to one another; and
    - a frangible portion connecting the first and second support portions to one another, with the frangible portion being adapted to fracture in response to the second support portion being engaged by one of the electrical connectors and the electrical connectors connecting with one another;

wherein the connection indicator is separate from the electric circuit; and wherein the feedback is at least one of a radio frequency signal (RF signal), an electronic signal, a visible light, and an acoustic signal.

9. A method of assembling an electrical connector assembly having a pair of electrical connectors and a connection indicator attached to at least one of the electrical connectors, the method comprising:

electrically connecting the electrical connectors to one another to create an electric circuit, with the connection indicator being separate from the electric circuit, wherein the connection indicator comprises:

a first support portion attached to one of the electrical connectors;

a second support portion for engaging the other one of the electrical connectors in response to the electrical connectors being connected to one another; and a frangible portion connecting the first and second support portions to one another, with the frangible portion being adapted to fracture in response to the second support portion being engaged by one of the electrical connectors and the electrical connectors connecting with one another; and generating, using the connection indicator, a feedback that comprises at least one of a radio frequency signal, an electronic signal, a visible light, and an acoustic signal in response to the electrical connectors being one of connected to one another and disconnected from one another.

* * * * *